(12) United States Patent
Dino et al.

(10) Patent No.: US 9,371,480 B2
(45) Date of Patent: Jun. 21, 2016

(54) SLURRY CONCENTRATE AND ASSOCIATED METHODS OF USE

(71) Applicant: Elementis Specialties, Inc., East Windsor, NJ (US)

(72) Inventors: David Dino, Cranbury, NJ (US); Jeffrey Thompson, Hightstown, NJ (US)

(73) Assignee: Elementis Specialties, Inc., East Windsor, NJ (US)

( * ) Notice: Subject to any disclaimer, the term of this patent is extended or adjusted under 35 U.S.C. 154(b) by 173 days.

(21) Appl. No.: 13/966,907

(22) Filed: Aug. 14, 2013

(65) Prior Publication Data

US 2015/0051121 A1    Feb. 19, 2015

(51) Int. Cl.
*C09K 8/64* (2006.01)
*C09K 8/62* (2006.01)

(52) U.S. Cl.
CPC .... *C09K 8/62* (2013.01); *C09K 8/64* (2013.01)

(58) Field of Classification Search
CPC ...... C09K 8/512; C09K 2208/30; C09K 8/24; C09K 8/32; C09K 8/36; C09K 8/502; C09K 8/5045; C09K 8/508; C09K 8/602; C09K 8/68; C09K 21/12; C09K 5/063; C09K 5/08; C09K 5/10; C09K 8/03; C09K 8/28; C09K 8/64; Y10S 507/925; Y10S 507/927; Y10S 507/935; Y10S 524/915; Y10S 977/742; E21B 43/26; E21B 17/042; E21B 17/043; E21B 17/046; E21B 17/07; E21B 17/1057; E21B 17/1078; E21B 19/002; E21B 2010/607; E21B 3/00; E21B 43/267; E21B 43/16; E21B 7/00; E21B 47/12; E21B 19/10; E21B 33/03; E21B 4/02; E21B 17/00; E21B 19/06; E21B 19/16; E21B 21/08; E21B 33/0422; E21B 34/02

See application file for complete search history.

(56) References Cited

U.S. PATENT DOCUMENTS

| | | | |
|---|---|---|---|
| 6,187,719 B1 * | 2/2001 | Dino | C01B 33/44 166/270 |
| 2003/0236173 A1 * | 12/2003 | Dobson, Jr. | C09K 8/035 507/110 |
| 2012/0129735 A1 * | 5/2012 | Dino | C09K 8/36 507/129 |

FOREIGN PATENT DOCUMENTS

| | | |
|---|---|---|
| WO | 2011152952 | 12/2011 |
| WO | WO2011/152952 | * 12/2011 |

OTHER PUBLICATIONS

International Search Report for International Patent Application No. PCT/US2014/050857, dated Nov. 17, 2014, 3 pages.
Written Opinion for International Patent Application No. PCT/US2014/050857, dated Nov. 17, 2014, 4 pages.

* cited by examiner

*Primary Examiner* — Susannah Chung
*Assistant Examiner* — Kumar R Bhushan
(74) *Attorney, Agent, or Firm* — Morgan, Lewis & Bockius, LLP

(57) ABSTRACT

The invention relates to a slurry concentrate which contains a viscosity enhancing polymer and organohectorite clay, which exhibits an unexpected improvement in viscosity and syneresis while exhibiting improved safety characteristics.

6 Claims, 6 Drawing Sheets

SLURRY CONCENTRATE AND ASSOCIATED METHODS OF USE

FIELD OF THE INVENTION

The present invention relates to slurry concentrates used in the fracturing of oil, gas, and geothermal wells. The slurry concentrates are useful for shale gas fracturing operations. More particularly, the invention relates to slurry concentrates containing a viscosity-enhancing polymer and organic-functionalized hectorite clay.

BACKGROUND OF THE INVENTION

Fracturing fluids are employed in oil and gas drilling operations, including shale gas and oil fracturing ("fracking") operations, Several types of fracturing fluids are used in the oil, gas, and geothermal well drilling operations. Water-based fracturing is commonly performed using "slick water". T. T. Palisch, M. C. Vincent, P. J. Handren, SPE Production & Operations, 25, 327-344, 2010. Another method used in the industry is known as "dry on fly" fluid fracturing. A third method used in the industry makes use of oil-based fracturing fluids. A fourth type of fracturing fluid may be prepared using a slurry of a viscosity-enhancing polymer.

Slurry concentrates known in the prior art and based on organoclays, such as bentonite, contain 2-3% crystalline silica, which presents a safety hazard to the workers handling such additives. A desirable slurry concentrate would contain minimal to no crystalline silica and could be handled by workers with less risk of personal harm.

SUMMARY OF THE INVENTION

A method to improve the stability of a slurry concentrate. A viscosity enhancing polymer, a hectorite organoclay composition and an aliphatic hydrocarbon carrier fluid are combined. The viscosity enhancing polymer is selected from galactomannan gums, guars, derivatized guars, cellulose and cellulose derivatives, starch, starch derivatives, xanthan, derivatized xanthan and mixtures thereof. The hectorite organoclay composition comprises (i) a hectorite clay having a cation exchange capacity of at least 110 milliequivalents per 100 grams of clay, 100% active clay basis and (ii) a quaternary ammonium salt having formula (I):

wherein $R_1$ and $R_2$ are methyl, $R_3$ is methyl or a linear alkyl group having from 14 to 18 carbon atoms and $R_4$ is a linear alkyl group having from 14 to 18 carbon atoms, and where X– is an anion, wherein the total amount of quaternary ammonium cation is provided in an amount from about +25% to –25% of the cation exchange capacity of the hectorite clay. The slurry concentrate exhibits a 300 rpm viscosity of less than 300 cP at 40° F. and a syneresis of less than 1% after 72 hours at 70° F. In some embodiments, the slurry concentrate further exhibits a 300 rpm viscosity of less than 120 cP at 70° F. and a syneresis of less than 2.5% after 24 hours at 100° F. In some embodiments, the viscosity enhancing polymer is guar.

In some embodiments, the amount of viscosity enhancing polymer is between about 40 weight % and 60 weight %. In some embodiments, the amount of hectorite organoclay is between about 1.0 weight % and 3.0 weight %.

In some embodiments, $R_1$, $R_2$, and $R_3$ are methyl and $R_4$ is a linear alkyl group having from 14 to 18 carbon atoms. In some embodiments, the quaternary ammonium cation is methyl tris[hydrogenated tallow alkyl]ammonium cation.

BRIEF DESCRIPTION OF THE DRAWINGS

The foregoing summary, as well as the following detailed description of embodiments of the method of the present invention, will be better understood when read in conjunction with the appended drawings of exemplary embodiments. In the drawings.

DETAILED DESCRIPTION OF THE INVENTION

In the practice of the present invention, a slurry concentrate is prepared comprising a viscosity enhancing polymer selected from the group consisting of: galactomannan gums, guars, derivatized guars, cellulose and cellulose derivatives, starch, starch derivatives, xanthan, derivatized xanthan and mixtures thereof; a hectorite organoclay composition, wherein the hectorite organoclay composition comprises (i) a hectorite clay having a cation exchange capacity of at least 110 milliequivalents per 100 grams of clay, 100% active clay basis and (ii) a quaternary ammonium cation having the formula (I):

wherein $R_1$ and $R_2$ are methyl, $R_3$ is methyl or a linear alkyl group having from 14 to 18 carbon atoms and $R_4$ is a linear alkyl group having from 14 to 18 carbon atoms, wherein the total amount of quaternary ammonium cation is provided in an amount from about +25% to –25% of the cation exchange capacity of the hectorite clay; and an aliphatic hydrocarbon carrier fluid.

Viscosity Enhancing Polymers

Viscosity enhancing polymers include galactomannan gums, guars, derivatized guars, cellulose and cellulose derivatives, starch, starch derivatives, xanthan, derivatized xanthan and mixtures thereof. The polymers include natural galactomannan gums, which are complex oligosaccharides that contain a backbone of mannose units with galactose units attached to the mannose backbone, and their derivatives and modifications. The galactomannan gums and their derivatives and modifications may contain attached hydroxyl, carboxyl, sulfate, sulfonate, amino, or amide functional groups. Natural galactomannans can include guar gum, locust bean gum, tara and other gums derived from endosperm seeds, and other gums. Galactomannan derivatives include hydroxyalkyl galactomannans, carboxyalkyl galactomannans, and hydroxyalkyl carboxyalkyl galactomannans. The use of guar, guar derivatives, and related polymers and oligomers as additives for fracturing fluids is further described in U.S. Pat. Nos. 3,081,260, 4,487,867, 5,165,479, 5,439,059, 6,387,853, and 7,790,774, which are incorporated by reference herein in their entirety. Guar is a complex oligosaccharide obtained from natural sources. Guar consists of branched chains of galactose and mannose sugars. Guar is currently widely used as an additive in fracturing fluids. Guar can be derivatized to improve its temperature stability in fracturing applications. The guar and derivatized guar products used as fracturing fluid additives can be powders or dispersions of powders in non-aqueous suspensions.

Organoclay

Hectorite is a magnesium-lithium silicate clay in the smectite family. Hectorite possesses a layered structure. To render it suitable for a slurry concentrate, hectorite and other smectite clays can be cation-exchanged to replace lithium and magnesium with other cations that lead to increases in the spacing between the silicate layers. Functionalized hectorite clays can be prepared using branched-chain quaternary ammonium salts as reactants as described in U.S. Pat. Nos. 2,966,506, 4,081,496, 4,105,578, 4,116,866, 4,208,218, 4,391,637, 4,410,364, 4,412,018, 4,434,075, 4,424,076, 4,450,095, 4,517,112, and 5,739,087, which are incorporated herein by reference. Functionalized hectorite clays are also referred to as "organoclays." The process to produce an organoclay involves the ion exchange of magnesium and lithium ions for the branched or linear-chain quaternary ammonium ions, resulting in the formation of expanded layers within the clay.

Hectorite organoclay compositions include hectorite and quaternary ammonium cations of formula (I). Functionalized hectorite organoclays can be prepared using branched or linear-chain quaternary ammonium salts as reactants as described in U.S. Pat. Nos. 2,966,506, 4,081,496, 4,105,578, 4,116,866, 4,208,218, 4,391,637, 4,410,364, 4,412,018, 4,434,075, 4,424,076, 4,450,095, 4,517,112, and 5,739,087, which are incorporated herein by reference. The process to produce an organoclay involves the ion exchange of magnesium and lithium ions for the branched or linear-chain quaternary ammonium ions, resulting in the formation of expanded layers within the clay.

In some embodiments, the quaternary ammonium cation of formula (I) has $R_1$, $R_2$, and $R_3$ are methyl and $R_4$ is a linear alkyl group having from 14 to 18 carbon atoms. In some embodiments, the quaternary ammonium ion includes trimethyl hydrogenated tallow ammonium salt, also known as 3MHT. In other embodiments, the quaternary ammonium ion also includes dimethyl dihydrogenated tallow quaternary ammonium salts (2 M 2 HT).

Generally, the viscosity enhancing polymer in the slurry concentrate is present at about 40 weight % to 60 weight %. More preferably, the viscosity enhancing polymer in the slurry concentrate is present at about 45 weight % to 50 weight %. Most preferably, the viscosity enhancing polymer in the slurry concentrate is present at about 47 weight %.

Generally, the organoclay in the slurry concentrate is present at about 1 weight % to 3 weight %. More preferably, the organoclay in the slurry concentrate is present at about 1.5 to 2.5 weight %. Most preferably, the organoclay is present at about 1.8 weight % to 2.2% weight %.

Measurements of the viscosity of a slurry concentrate provide a means of assessing the suspension characteristics of the concentrate. It does impact the homogeneity of the polymer delivery system. The viscosity has to be low enough to be able to pump the slurry at low temperatures (e.g., 40° F.) and high enough to suspend the polymer in oil at storage conditions (e.g., 100° F.). Homogeneity will impact the ability to deliver polymers such as guar to the annulus. Slurries do not impact the viscosity of the fluid in the annulus.

Determination of syneresis provides an indication of the homogeneity of the slurry concentrate. Syneresis is defined as the loss of homogeneity that occurs in a slurry when contraction of a gel leads to the expulsion of liquid. As used herein, lower syneresis values generally correlate with a more homogeneous slurry concentrate and a more effective delivery of the slurry concentrate to the annulus which improves the fracturing fluids performance.

The invention is further described by the following non-limiting examples, which illustrate the surprising superiority of the slurry concentrate.

EXAMPLES

Slurry concentrates as described below were formulated and tested for functional and rheological properties. Two batches were prepared for each screened additive. Samples of each slurry concentrate were used to fill 100 mL glass graduated cylinders for static aging observation at ambient temperature, 40° F., and 100° F. The remaining portion of each slurry concentrate was equally distributed into three 16 ounce glass jars that were stored at ambient temperature, 40° F., and 100° F. The viscosity at 300 revolutions per minute ("rpm") of each jarred sample was measured using an OFI-800 viscometer (OFI Testing Equipment, Houston, Tex.). Measurements were performed following the procedures described in API RP 13B.

Syneresis was determined using the following procedure. After a determined time interval, a visual measurement of clear liquid on the top of a 100 ml graduate cylinder filled with slurry concentrate was taken and reported as % syneresis. Since a 100 ml graduate was used, 1 ml of syneresis is equivalent to 1%.

Example 1

Example 1 illustrates the results obtained from a slurry concentrate prepared according to the present invention. The organoclays were prepared by first placing 85.7 g of 3 MHT in an oven at 65° C. At the same time, 107.9 g of hectorite clay was placed in a bakers tray and warmed in the oven. When the 3 MHT became molten, the 3 MHT and clay were both removed from the oven and the amine was poured onto the clay. The resulting organoclay was hand dispersed with a spatula for 5 minutes. The organoclay was then ground through a hand-turned meat grinder (3 passes). This ground organoclay was then dried in a forced hot air oven at 105° C. for approximately 16 hrs. The dried organoclay was milled using a Brinkman mill (0.5 micron mesh screen, 1 pass). The milled, dried organoclay was used to prepare guar slurries.

Guar slurries were prepared by charging materials to a 1 L stainless steel beaker using an overhead stirring motor equipped with a 4-paddle, 2.5 cm×1.0 cm stirring blade using the following procedure, which was repeated for each level of organoclay used. EcoNo 818 mineral oil solvent (313.2 g,) was charged to the beaker. The organoclay was then charged at levels of 1.8%, 2.0%, or 2.2% by weight and the mixture was stirred for 5 min at 1000 rpm. Propylene carbonate (4.4 g) was then charged and the mixture was stirred for 5 min at 1250 rpm. Guar (287.4 g) was then added and the mixture was stirred at 1300 to 1500 rpm for 10 min. Tergitol (2.6 g) was then added, and the combined mixture was stirred for 10 min at 1600 to 1800 rpm.

Figure 1:
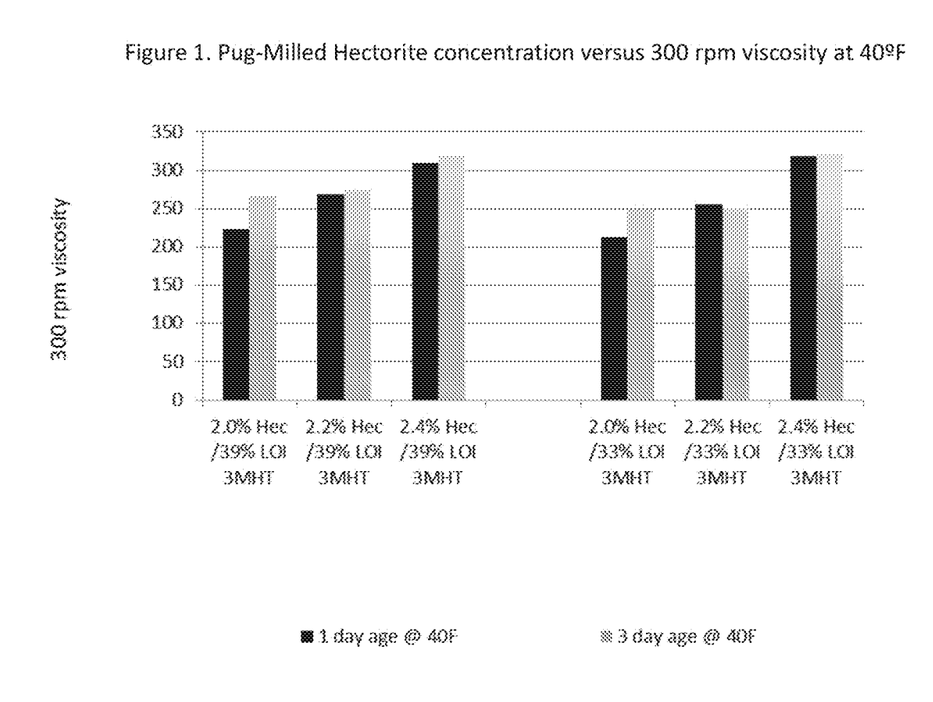
FIG. 1 shows pug-milled hectorite concentration in a slurry formulation versus 300 rpm viscosity at 40° F. Viscosity values are given in units of centipoise (cP).
Figure 2:
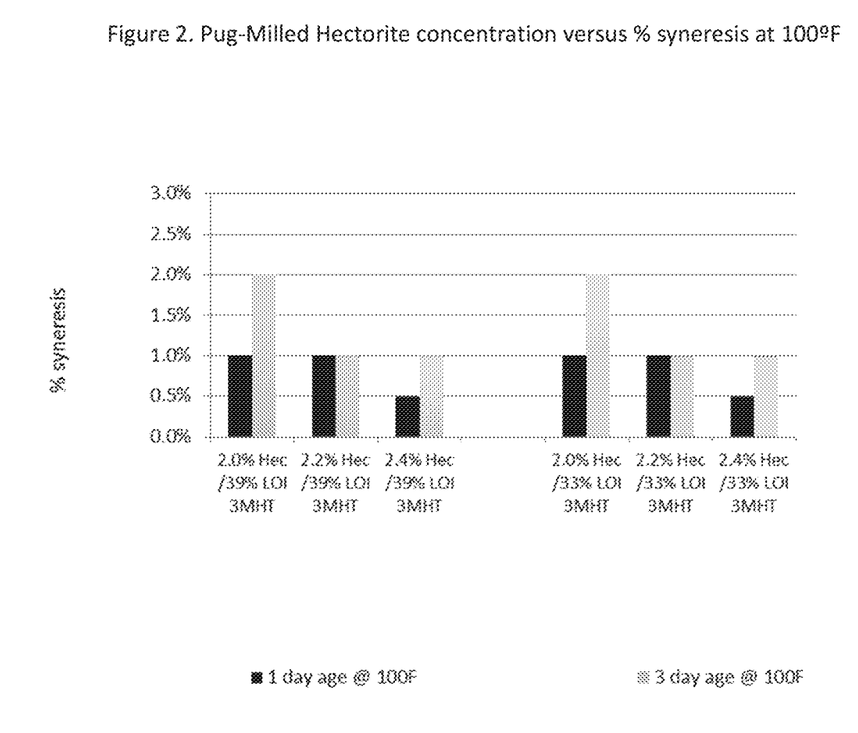
FIG. 2 shows pug-milled hectorite concentration in a slurry formulation versus % syneresis at 100° F.

The results of viscosity measurements at 300 rpm and 40° F. are shown in FIG. 1. The results of syneresis measurements at 100° F. are shown in FIG. 2.

Example 2

Example 2 illustrates the results obtained from a slurry concentrate prepared according to the present invention. The organoclays were prepared by first placing 85.7 g of 3 MHT in an oven at 65° C. At the same time, 107.9 g hectorite clay was added to tap water in a stainless steel reactor, using sufficient tap water to produce a slurry containing 5% by weight of hectorite clay. The stainless steel reactor was equipped with an overhead stirrer and thermal controller. The slurry was warmed to 65° C. When the 3 MHT became molten and the slurry reached temperature, the 3 MHT was charged to the hectorite clay slurry and mixed for 1 hour in the stainless steel reactor. After 1 hour, the organoclay mixture was filtered. The collected organoclay was dried for approximately 16 hours in a forced hot air oven at 105° C. The dried organoclay was milled using a Brinkman mill (0.5 micron mesh screen, 1 pass). The milled, dried organoclay was used to prepare guar slurries.

Slurry concentrates were prepared by charging materials to a 1 L stainless steel beaker using an overhead stirring motor equipped with a 4-paddle, 2.5 cm×1.0 cm stirring blade using the following procedure, which was repeated for each level of organoclay used. EcoNo 818 mineral oil solvent (313.2 g,) was charged to the beaker. The organoclay was then charged at levels of 1.8%, 2.0%, or 2.2% weight and the mixture was stirred for 5 min at 1000 rpm. Propylene carbonate (4.4 g) was then charged and the mixture was stirred for 5 min at 1250 rpm. Guar (287.4 g) was then added and the mixture was stirred at 1300 to 1500 rpm for 10 min. Tergitol 15S9 (2.6 g) was then added, and the combined mixture was stirred for 10 min at 1600 to 1800 rpm.

Figure 3:
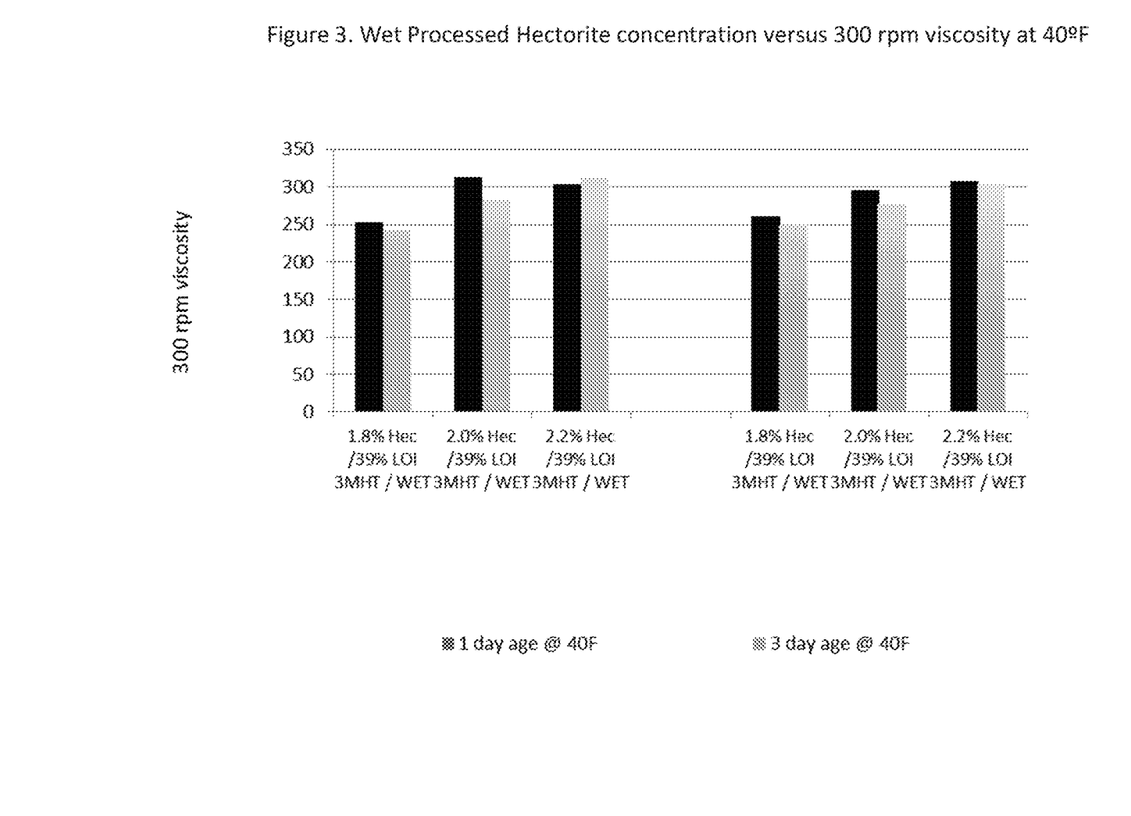
FIG. 3 shows wet processed hectorite concentration in a slurry formulation versus 300 rpm viscosity at 40° F. Viscosity values are given in units of cP.
Figure 4:
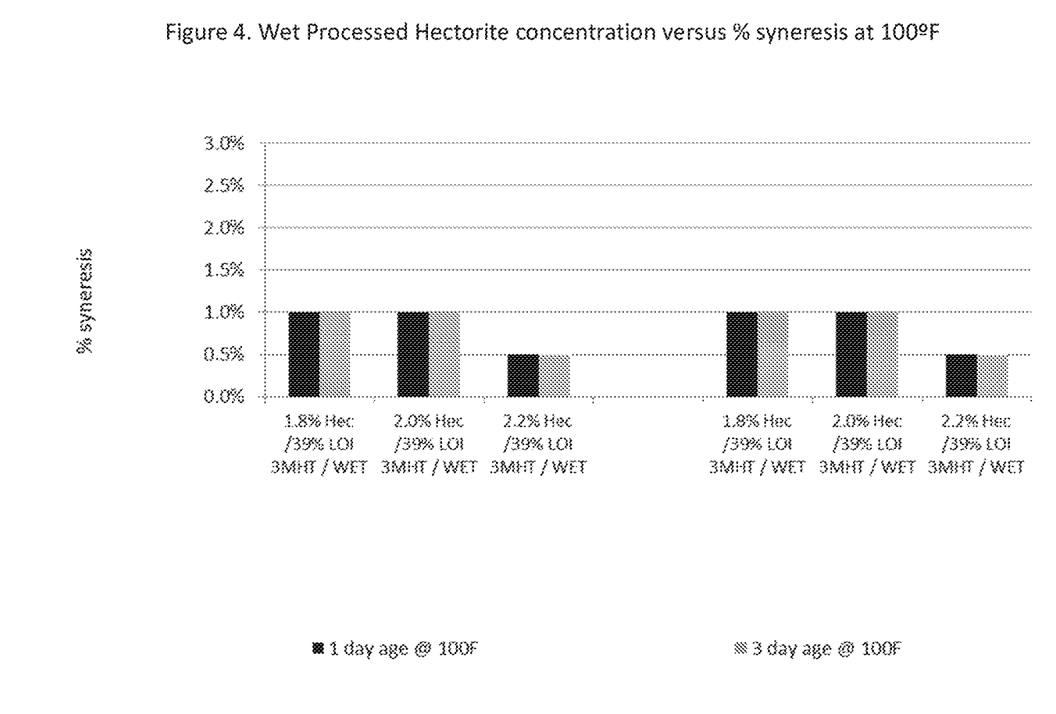
FIG. 4 shows wet processed hectorite concentration in a slurry formulation versus % syneresis at 100° F.

The results of viscosity measurements at 300 rpm and 40° F. are shown in FIG. 3. The results of syneresis measurements at 100° F. are shown in FIG. 4.

Example 3

Example 3 illustrates the results obtained from a slurry concentrate prepared according to the present invention in comparison to a previous slurry concentrate of Example 2. The additives were prepared as described in Examples 1 and 2 above. A control sample using an organoclay prepared from bentonite and methyl benzyl dihydrogenated tallow quaternary ammonium salt (2 M 2 HT) was prepared. The procedure described in example 2 was used to evaluate the slurry concentrate. For the particular lot of guar used in this example, the concentration of bentonite/2 M 2 HT organoclay in the formulation to achieve the target parameters was 2.4 wt. %. This achieved an average viscosity of 260 cP at 300 rpm at 40° F., and a syneresis after 3 days at 100° F. of 1%. The control slurry concentrate was compared to the slurry concentrates prepared in Examples 1 and 2.

Figure 5:
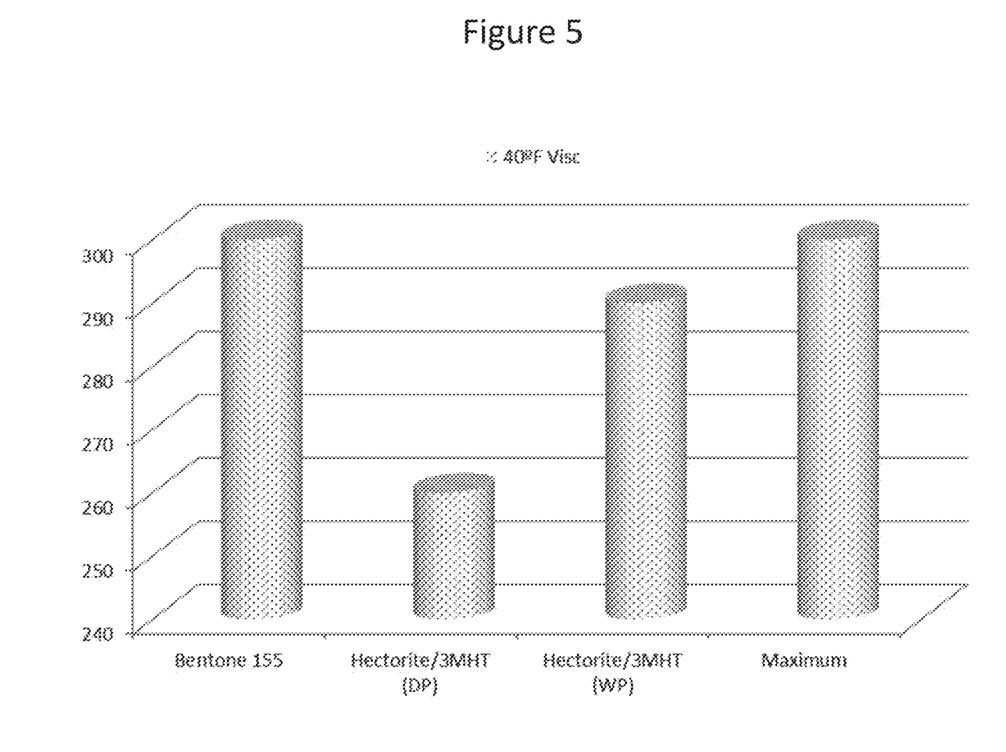
FIG. 5 shows a comparison of the 300 rpm viscosity results in a slurry formulation obtained at 40° F., in units of cP, for slurry concentrates prepared using a different organoclay.

The results of the comparison are summarized in FIG. 5. The slurry concentrates, prepared according to the present invention, using hectorite/3 MHT organoclay shows superior performance. In particular, the additive prepared using the dry process of Example 1 shows significantly reduced viscosity with similar syneresis, which is a desirable feature for a slurry concentrate. FIG. 5 also illustrates a maximum viscosity acceptable for commercial application of a slurry concentrate.

Figure 6:
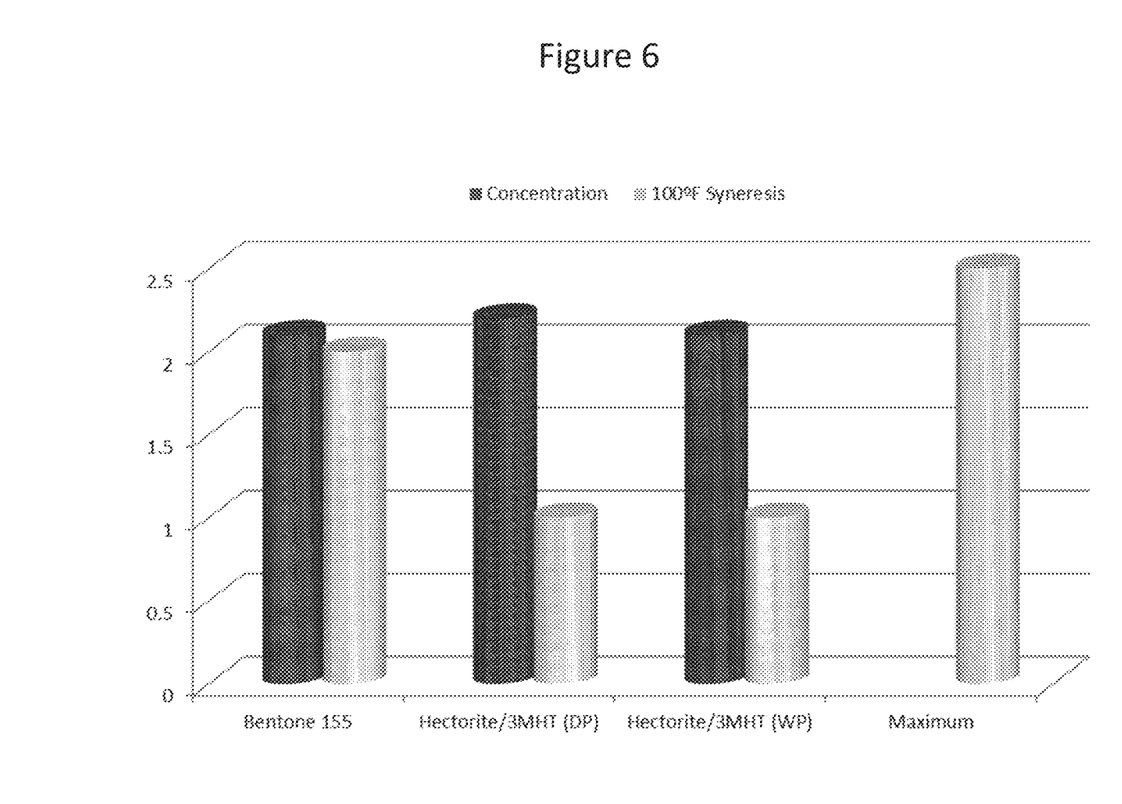
FIG. 6 shows a comparison of the % syneresis for a slurry formulations prepared using a different organoclay.

FIG. 6 shows the comparative syneresis results for the slurry concentrate prepared according to Examples 1 and 2 using hectorite/3 MHT and the additive prepared using bentonite/2 M 2 HT. The slurry concentrate containing hectorite/3 MHT organoclay showed superior performance. FIG. 6 also illustrates a maximum syneresis acceptable for commercial application of a slurry concentrate.

The slurry concentrate containing hectorite/3 MHT organoclay, when combined with hydrocarbons or oils, result in unexpected and useful performance characteristics. In particular, slurry concentrates using hectorite/3 MHT organoclay, when combined with hydrocarbons or oils, provide a slurry having a 300 rpm viscosity of less than 300 at 40° F., a 300 rpm viscosity greater than 120 at room temperature, a syneresis of less than 1% after 3 days at room temperature, and a syneresis of less than 2.5% after 1 day at 100° F.

What is claimed is:

1. A method to improve the stability of a slurry concentrate comprising the steps of:
    combining a viscosity enhancing polymer, a hectorite organoclay composition and an aliphatic hydrocarbon carrier fluid, wherein the viscosity enhancing polymer is selected from the group consisting of: glactomannan gums, guars, derivatized guars, cellulose and cellulose derivatives, starch, starch derivatives, xanthan, derivatized xanthan and mixtures thereof;
    wherein the hectorite organoclay composition comprises (i) a hectorite clay having a cation exchange capacity of at least 110 milliequivalents per 100 grams of clay, 100% active clay basis and (ii) a quaternary ammonium salt having formula (I):

wherein $R_1$ and $R_2$ are methyl, $R_3$ is methyl or a linear alkyl group having from 14 to 18 carbon atoms and $R_4$ is a linear alkyl group having from 14 to 18 carbon atoms, and where $X^-$ is an anion, wherein the total amount of quaternary ammonium cation is provided in an amount from about +25% to −25% of the cation exchange capacity of the hectorite clay, wherein the slurry concentrate exhibits a 300 rpm viscosity of less than 300 cP at 40° F. and a syneresis of less than 1% after 72 hours at 70° F. where the amount of hectorite organoclay is between about 1.0 weight % and 3.0 weight %.

2. The method according to claim 1, wherein the slurry concentrate further exhibits a 300 rpm viscosity of less than 120 cP at 70° F. and a syneresis of less than 2.5% after 24 hours at 100° F.

3. The method according to claim 1, where the viscosity enhancing polymer is guar.

4. The method according to claim 1, where the amount of viscosity enhancing polymer is between about 40 weight % and 60 weight %.

5. The method according to claim 1, wherein $R_1$, $R_2$, and $R_3$ are methyl and $R_4$ is a linear alkyl group having from 14 to 18 carbon atoms.

6. The method according to claim 1, wherein the quaternary ammonium cation is methyl tris[hydrogenated tallow alkyl]ammonium cation.

\* \* \* \* \*